UNITED STATES PATENT OFFICE.

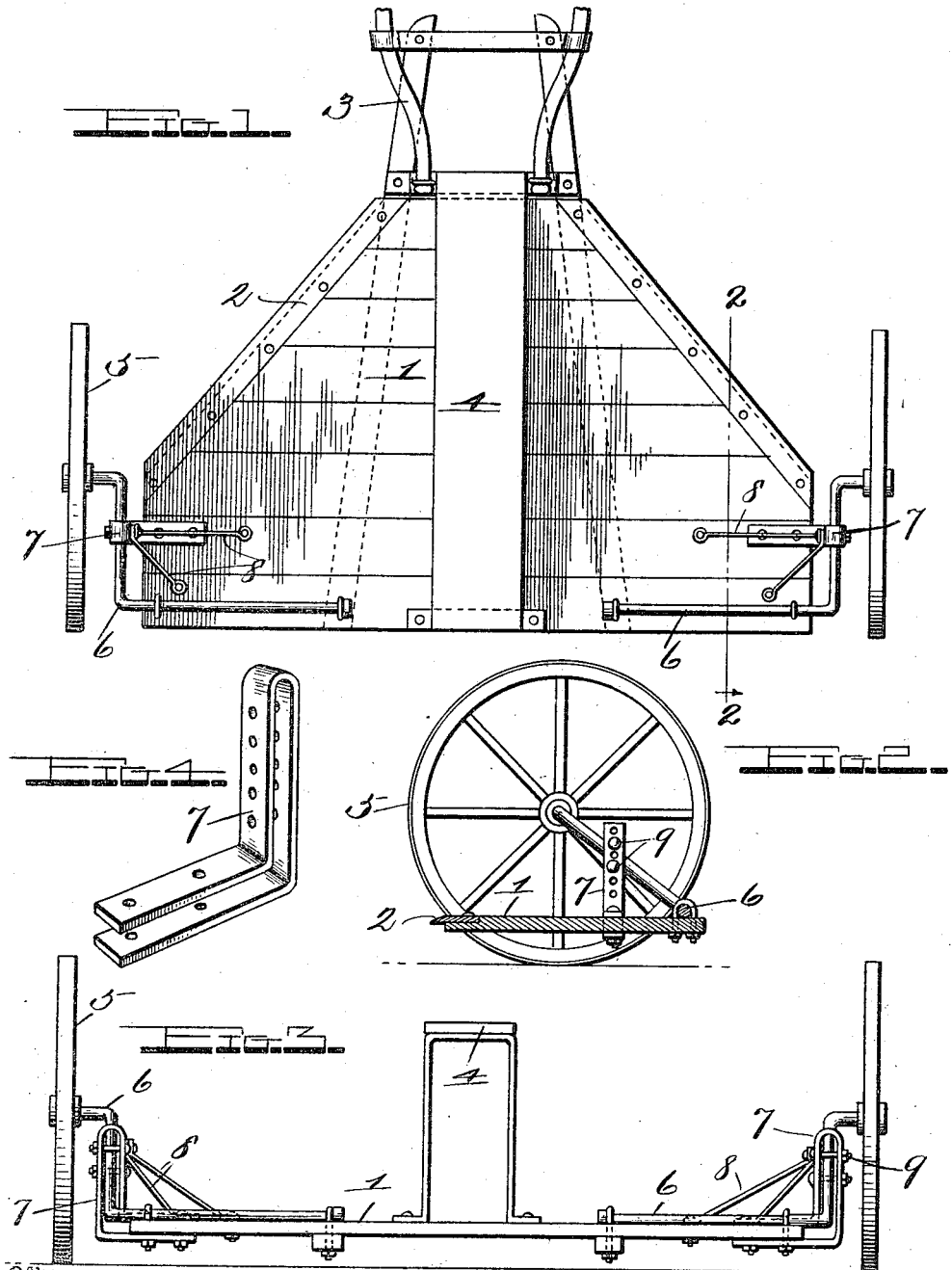

ALVA GREEN DAVIS, OF THREE SPRINGS, KENTUCKY.

CORN-CUTTER.

1,211,100.     Specification of Letters Patent.     Patented Jan. 2, 1917.

Application filed March 30, 1915. Serial No. 18,018.

*To all whom it may concern:*

Be it known that I, ALVA G. DAVIS, a citizen of the United States, residing at Three Springs, in the county of Hart and State of Kentucky, have invented a new and useful Improvement in Corn-Cutters, of which the following is a specification.

This invention relates to a one-horse corn cutter adapted to be driven through the field and cutting two rows of stalks at a time, the horse walking between the rows.

It has seating capacity for two persons, one facing one side and the other the opposite side so that the corn cut on each side can be taken care of, if it is desired to bunch the stalks as cut, or they can be allowed to fall and left in a windrow, or otherwise handled, as may be most convenient.

The invention also includes simple and easy means of regulating the height at which the corn is to be cut.

The entire device is very simple in construction, all parts are readily repaired or replaced and the device can be of cheap and at the same time durable construction.

In the accompanying drawings, Figure 1 is a plan view. Fig. 2 is a section on the line 2—2 of Fig. 1. Fig. 3 is a rear elevation. Fig. 4 is a detail perspective view of a standard.

In constructing the device I employ a platform 1 having converging sides to which are secured cutting blades 2, the blades converging toward their front ends so that they will cut along the rows of stalks at an angle. Suitable draft means such as shafts 3 are connected to and support the forward end of the platform. A seat 4 runs centrally and longitudinally along the platform from rear to front. Wheels 5 are provided on each side, and each wheel has an angled drop-axle 6. The depending portions of these axles incline downwardly and rearwardly, the rear portion of the platform being pivotally hung on said axles.

On the platform and at a point intermediate the wheel hubs and the pivoting of the axles to the platform I arrange vertical standards 7. These standards are preferably formed of pieces of strap iron bent back upon themselves and having the lower ends angled so that the edges of the platform fit between the lower angled portions of the standards. These standards form vertical guideways through which the inclined portions of the axles 6 pass. The standards are perforated, five or more openings being formed in the vertical portion of the standards and through which bolts 9 may be passed, while suitable braces 8 are employed to brace the standards.

Preferably bolts are passed through two adjacent openings, and the axles pass between said bolts. By shifting the bolts from one set of openings to another the rear portion of the platform is raised or lowered, thereby adjusting the height and cutting angle of the blades 2.

What I claim is:

In a device of the kind described, a platform having forwardly converging cutting edges, supporting wheels, drop axles on which said wheels are mounted, said axles being journaled on said platform, U-shaped straps having horizontal and vertical portions and provided with perforations the horizontal portions of the straps engaging the sides of the platform, and the axles passing obliquely through the vertical portions of the straps, and means passing through the perforations of the straps for supporting said axles and regulating the extent of their inclination from the perpendicular.

ALVA GREEN DAVIS.

Witnesses:
  E. V. WITHERS,
  NELL WITHERS.

Copies of this patent may be obtained for five cents each, by addressing the "Commissioner of Patents, Washington, D C."